United States Patent
Kobayashi et al.

(10) Patent No.: US 9,096,040 B2
(45) Date of Patent: Aug. 4, 2015

(54) PLASTIC FILM AND INFUSION BAG

(75) Inventors: Yukio Kobayashi, Ota-ku (JP); Yohei Kageyama, Kawasaki (JP); Manabu Nakamura, Yokohama (JP); Masataka Kotani, Kawasaki (JP); Toshiharu Iwasaki, Kawasaki (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 107 days.

(21) Appl. No.: 13/502,908

(22) PCT Filed: Oct. 18, 2010

(86) PCT No.: PCT/JP2010/068248
§ 371 (c)(1),
(2), (4) Date: Apr. 19, 2012

(87) PCT Pub. No.: WO2011/049031
PCT Pub. Date: Apr. 28, 2011

(65) Prior Publication Data
US 2012/0201984 A1    Aug. 9, 2012

(30) Foreign Application Priority Data
Oct. 20, 2009    (JP) .................. 2009-241195

(51) Int. Cl.
*B29D 22/00* (2006.01)
*B32B 27/34* (2006.01)
(Continued)

(52) U.S. Cl.
CPC . *B32B 27/34* (2013.01); *A61J 1/10* (2013.01); *B32B 7/02* (2013.01); *B32B 27/08* (2013.01);
(Continued)

(58) Field of Classification Search
CPC .......... A61J 1/10; B32B 27/08; B32B 27/28; B32B 27/32; B32B 27/34; B32B 2307/306; B32B 2439/46; B32B 2439/80
USPC .......................................................... 428/35.2
See application file for complete search history.

(56) References Cited

U.S. PATENT DOCUMENTS 6,461,732 B1   10/2002   Wittmann et al.
2002/0099354 A1*  7/2002   Ronneklev .................... 604/408
(Continued)

FOREIGN PATENT DOCUMENTS

CN          1227524 A      9/1999
EP          1584463 A1    10/2005
(Continued)

OTHER PUBLICATIONS

Machine Translation of JP 06190990 A; 1994.*
(Continued)

*Primary Examiner* — James Yager
(74) *Attorney, Agent, or Firm* — Sughrue Mion, PLLC

(57) ABSTRACT

The present invention relates to a plastic film (10) formed by a co-extrusion method, and an infusion bag formed thereof. The plastic film (10) includes at least three layers having: a first layer (1) constituted by a polyamide obtained by a ring-opening polymerization of a lactam having 11 or more carbon atoms or by polycondensing of an ω-amino acid having 11 or more carbon atoms, or a polyamide obtained by copolycondensing a dicarboxylic acid having 10 or more carbon atoms and a diamine having 6 or more carbon atoms; a second layer (2) containing a copolymer of an α-olefin and an anhydride monomer of an unsaturated carboxylic acid or an unsaturated dicarboxylic acid as the major component; and a sealing layer (3) containing a polyethylene as the major component.

5 Claims, 1 Drawing Sheet

(51) Int. Cl.
*A61J 1/10* (2006.01)
*B32B 27/08* (2006.01)
*B32B 27/28* (2006.01)
*B32B 27/32* (2006.01)
*B32B 7/02* (2006.01)

(52) U.S. Cl.
CPC ............... *B32B 27/28* (2013.01); *B32B 27/32* (2013.01); *B32B 2307/31* (2013.01); *B32B 2439/80* (2013.01); *Y10T 428/1334* (2015.01); *Y10T 428/31757* (2015.04)

(56) References Cited

U.S. PATENT DOCUMENTS

2004/0043239 A1 3/2004 Iwasaki et al.
2008/0063825 A1* 3/2008 Mori et al. .................. 428/36.6

FOREIGN PATENT DOCUMENTS

| JP | 6-190990 A | 7/1994 |
| JP | 8-258211 A | 10/1996 |
| JP | 09109274 A | 4/1997 |
| JP | 9-308683 A | 12/1997 |
| JP | 2001506200 A | 5/2001 |
| JP | 2003-237002 A | 8/2003 |
| JP | 2006-81898 A | 3/2006 |
| JP | 2007-245490 A | 9/2007 |
| RU | 2113125 C1 | 6/1998 |
| RU | 2275811 C2 | 5/2006 |
| WO | 9915289 A2 | 4/1999 |

OTHER PUBLICATIONS

Machine Translation of JP 09308683 A; 1997.*
International Search Report for PCT/JP2010/068248 dated Jan. 18, 2011.
Notice of Grounds for Rejection dated Sep. 23, 2013, issued in Korean Patent Application 10-2012-7012342.
European Patent Office, "Communication with Extended Search Report," issued in connection with European Patent Application No. 10824880.8, dated Dec. 18, 2013.
Russian Patent Office, "Decision on Grant of Patent for Invention," issued in connection with Russian Patent Application No. 2012119474, dated Feb. 13, 2014.
The Patent Office of the People's Republic of China, "Office Action and Search Report," issued in connection with Chinese Patent Application No. 201080046951.2, dated Dec. 6, 2013.

* cited by examiner

PLASTIC FILM AND INFUSION BAG

CROSS REFERENCE TO RELATED APPLICATIONS

This application is a National Stage of International Application No. PCT/JP2010/068248 filed Oct. 18, 2010, claiming priority based on Japanese Patent Application No. 2009-241195 filed Oct. 20, 2009, the contents of all of which are incorporated herein by reference in their entirety.

TECHNICAL FIELD

The present invention relates to a plastic film for medical containers, and an infusion bag using such a plastic film.
Priority is claimed on Japanese Patent Application No. 2009-241195, filed Oct. 20, 2009, the content of which is incorporated herein by reference.

BACKGROUND ART

As medical containers such as bags for infusions, medial solutions, and the like, soft bags made of polyethylene, polypropylene, polyvinyl chloride, or the like into a bag by blow molding or heat sealing, are used in addition to glass bottles of the related art. Since such soft bags are light-weighted, have small volumes when the bags are disposed, and even do not require ventilation needles that cause nosocomial infection occurring during administration, soft bags are mainstream.

A film used in the soft bags of the related art is composed of a polyolefin material including polyethylene, polypropylene, or the like in order to reduce amount of eluted materials in steam autoclaving, and maintain transparency and flexibility of the film. For this reason, a bag-making process by external heating such as heat sealing is conducted with caution for some period of time so that the surface of the film is not damaged.

For the purpose of reducing the damage on the film subjected to external heating in steam autoclaving, various inventions have been attained in which a heat resistant material is arranged in the external layer.

For example, Patent Document 1 discloses that an oriented polyamide film, an oriented polypropylene film, or an oriented polyethylene terephthalate film is arranged in the external layer, an anchor agent is applied on the inner surface, and then an adhesive resin is laminated. However, 0.05 to 1 g/m² of an organic solvent with a urethane base, an imine base, or the like is applied as the anchor agent. The figures are within the elution test specifications defined by Japanese Pharmacopoeia, and however the amount of eluted material cannot be negligible. Furthermore, since extrusion or sandwich lamination has to be gone through, incorporation of foreign substances into an exposed lamination interface is a concern.

Patent Document 2, for example, discloses a laminated body in which a polyamide film having a heat resistance property is arranged. Since the laminated body is designed with the main object of giving a gas barrier property thereto, and is not the outermost layer, it is slightly effective at reducing damage on the film when the film is made into a bag. Furthermore, since such inventions use the dry lamination method that uses an organic solvent-based adhesive, there is the same concern as in above-described Patent Document 1.

PRIOR ART DOCUMENT

Patent Document

[Patent Document 1] Japanese Patent Application, First Publication No. H8-258211

[Patent Document 2] Japanese Patent Application, First Publication No. 2006-81898

SUMMARY OF INVENTION

Problem to be Solved by the Invention

As described above, the plastic film for medical containers of the related art has problems not only of having little effect in reducing damage on the film when the film is made into a bag, but also of having elution of adhesive as an organic solvent based adhesive is used therein. Furthermore, incorporation of foreign substances into the lamination interface is a concern.

Means for Solving the Problem

In order to achieve the above object, the invention employs the following means. In other words:

(1) the invention is a plastic film formed in co-extrusion method including at least three layers. The plastic film includes: a first layer that contains a polyamide obtained from a ring-opening polymerization of a lactam having 11 or more carbon atoms or from polycondensation of an ω-amino acid having 11 or more carbon atoms, or a polyamide obtained from copolycondensation of a dicarboxylic acid having 10 or more carbon atoms and a diamine having 6 or more carbon atoms; a second layer that contains as the main component a copolymer of an α-olefin and an anhydride monomer of an unsaturated carboxylic acid or an unsaturated dicarboxylic acid; and a sealing layer that contains a polyethylene as the main component.

(2) the plastic film described in the above (1) may be configured so that the melting peak temperature of the first layer is 175° C. or higher, and the difference between the melting peak temperature of the first layer and the melting peak temperature of the sealing layer is 40° C. or larger.

(3) the plastic film described in the above (1) or (2) may be configured so that the sealing layer is a mixture of 60 to 95 mass % of a linear low-density polyethylene and 5 to 40 mass % of a high-density polyethylene.

(4) the plastic film described in any one of the above (1) to (3) may be configured that the sealing layer includes two layers which are a layer adjacent to the second layer constituted by a mixture of 60 to 95 mass % of a linear low-density polyethylene and 5 to 40% of high-density polyethylene, and a layer which is adjacent to the layer adjacent to the second layer and constituted by a high-density polyethylene.

(5) the plastic film according to any one of (1) to (4) described in any one of the above (1) to (4) may be formed by a co-extruder using a water cooling inflation method.

(6) In addition, the invention relates to an infusion bag in which a pouring opening is provided on the main body of the infusion bag formed of the plastic film described in any one of the above (1) to (5).

Effects of Invention

The plastic film of the invention, which is excellent in hygienic safety prescribed by Japanese Pharmacopoeia, can be made into a bag with ease by heat sealing in high temperature and for a short period of time. The plastic film of the invention has excellent impact resistance strength with heat resistance, transparency, and flexibility sufficient to withstand a steam autoclaving process under high pressure at 121° C.

For this reason, it is possible to swiftly make the film into a bag without inflicting damage on the surface of the film in a heat sealing process, and there is an extremely low possibility of incorporation of foreign substances originating from outside in between film layers. Therefore, an infusion bag made of the plastic film is excellent in hygienic safety.

DESCRIPTION OF EMBODIMENTS

Hereinafter, the invention will be described in further detail.

Figure 1:
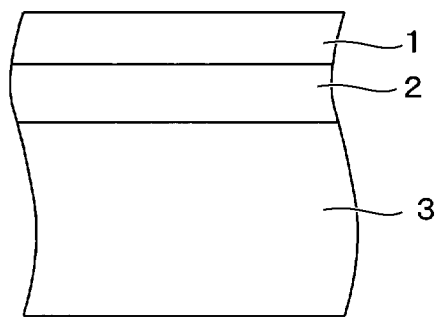
FIG. 1 is a partial cross-sectional view of an example of a plastic film according to the invention.

FIG. 1 shows a layer structure of an example of a plastic film according to the invention. The film is constituted in a three-layer structure including a first layer 1, a second layer 2 and a sealing layer 3 from the top.

The first layer 1 in the invention refers to the outermost layer, and is a buffer layer against damage on the film resulting from heating from outside during thermal adhesion of a port. The port is a member of inlet or outlet for medial solutions, and adheres to the film by heat in a bag-making process.

The first layer 1 includes a polyamide obtained by conducting ring-opening polymerization for a lactam having 11 or more carbon atoms, or by conducting condensation polymerization for ω-amino acid having 11 or more carbon atoms. Alternatively, the layer includes a polyamide obtained by conducting co-condensation polymerization for a dicarboxylic acid having 10 or more carbon atoms and a diamine having 6 or more carbon atoms.

The lactam that has undergone ring-opening polymerization has 11 or more carbon atoms, but the upper limit of the number of carbon atoms is 12. If the number of carbon atoms of a lactam monomer that polymerizes a polyamide is less than 11, it is not favorable in that a depolymerization reaction of a lactam easily occurs when used under high temperature, the medical container falls short of the elution test specifications defined for such a container, and whitening occurs during steam autoclaving under high pressure due to a high hygroscopic property. As an example of a lactam, an undecane lactam, a lauryl lactam, or the like can be exemplified. The method of ring-opening polymerization is well known as the production method of a polyamide, and found on the market. If ring-opening polymerization is conducted for an undecane lactam, nylon 11 is obtained, and if ring-opening polymerization is conducted for a lauryl lactam, nylon 12 is obtained.

The number of carbon atoms of ω-amino acid that has undergone condensation polymerization is also 11 or more, but the upper limit of the number of carbon atoms is 12. If the number of carbon atoms is less than 11, there is the same problem as of the lactam. As an example of a ω-amino acid, a ω-aminoundecanoic acid, a ω-aminododecanoic acid, or the like can be exemplified. The method of the condensation polymerization is also well known as a production method of a polyamide, and also found on the market.

A dicarboxylic acid used when conducting co-condensation polymerization for a dicarboxylic acid and a diamine has 10 or more carbon atoms, and the upper limit of the number of carbon atoms is 12. As an example of the dicarboxylic acid, a sebacic acid, a dodecanedioic acid, or the like can be exemplified. The diamine has 6 or more carbon atoms. If the number of carbon atoms is less than 6, it is difficult to pass the elution test of Japanese Pharmacopoeia. As an example of a diamine, a hexamethylene diamine, or the like can be exemplified. The method of the co-condensation polymerization is well known as the production method of a polyamide, and also found on the market. If a sebacic acid undergoes co-condensation polymerization with a hexamethylene diamine, nylon 610 is obtained. If a dodecanedioic acid undergoes co-condensation polymerization with a hexamethylene diamine, nylon 612 is obtained.

A polyamide obtained from the above three methods may be used in single, or may be mixed at an arbitrary ratio.

A polyamide to be used may have the melting peak temperature of 175° C. or higher, preferably have about 175 to 245° C., and further preferably have about 175 to 230° C. The melting peak was measured based on JIS-K7121 using a DSC, a differential scanning calorimeter.

The thickness of the first layer 1 is 2 to 15% of the total thickness, and preferably 2 to 10% thereof, and more preferably is 2 to 8% thereof. If the thickness of the first layer 1 is less than 2% thereof, the buffer effect against damage caused by heat transmission during sealing is not sufficient. And, if the thickness of the first layer 1 exceeds 15% thereof, rigidity as a multi-layered film remarkably increases, flexibility as a medical container deteriorates.

The second layer 2 in the invention refers to the layer inwardly adjacent to the first layer 1, and is an interlayer adhesive layer for the first layer 1 and the sealing layer 3 to be described later. The second layer 2 includes a copolymer of an α-olefin and an anhydride monomer such as an unsaturated carboxylic acid or an unsaturated dicarboxylic acid as its main component.

Hereinafter, the second layer 2 will be described in detail. As an α-olefin used in the invention, an ethylene or a propylene can be exemplified. A polyolefin that is a homopolymer or copolymer of an ethylene, propylene, or the like is obtained by conducting homopolymerization or copolymerization for an olefin. The homopolymerization or copolymerization is conducted by using a catalytic system (Ziegler catalyst) obtained from a transition metal compound and an organic aluminum compound, using a catalytic system (Phillips catalyst) obtained by making a carrier (for example, a silica) carry a chromium compound (for example, a chromium oxide), or using a radical initiator (for example, an organic peroxide).

In addition, the anhydride monomer such as an unsaturated carboxylic acid or an unsaturated dicarboxylic acid used in the invention is a compound having at least one double bond and containing at least one carboxyl group or an anhydride (group) thereof. A (meta) acrylic acid, a maleic acid, an itaconic acid, a citraconic acid, an endic acid, a maleic acid anhydride, an itaconic acid anhydride, an endic acid anhydride, a citraconic acid anhydride, or the like can be exemplified.

A copolyer of an α-olefin and an anhydride monomer such as an unsaturated carboxylic acid or an unsaturated dicarboxylic acid used in the second layer 2 in the invention refers to a graft copolymer of an unsaturated monomer of the above-described polyolefin. The graft copolymer is obtained by supplying to an extruder a mixture obtained by adding 0.01 to 20 pts. mass of an unsaturated monomer and 0.001 to 20 pts. mass of an organic peroxide to 100 pts. mass of a polyolefin, and melting the mixture to react.

As typical examples of the organic peroxide used in the invention, t-butyl peroxybenzoate, 2,5-dimethyl-2,5-di(t-butyl peroxy)hexane, or di-t-butyl peroxide can be exemplified.

Among the organic peroxides, an organic peroxide having one minute half-life period temperature which is 100 to 280° C. is desirable, and an organic peroxide having one minute half-life period temperature which is 120 to 230° C. is preferable. Such organic peroxides may be used singularly, or in combination of two or more kinds thereof may be used together.

If less than 0.01 pts. mass of the anhydride monomer such as an unsaturated carboxylic acid or an unsaturated dicarboxylic acid is blended with 100 pts. mass of a polyolefin, the adhesiveness between the obtained copolymer and a polyamide is poor. On the other hand, if the blended ratio exceeds 20 pts. mass, efficiency of graft reaction is lowered. Thus, a large amount of unsaturated compounds that are unreacted or monopolymerized remains during the graft reaction, and even the intrinsic physical properties of the polyolefin are impaired.

In addition, if less than 0.001 pts. mass of an organic peroxide is blended with 100 pts. mass of a polyolefin, a satisfactory graft copolymer is not obtained. On the other hand, if the ratio exceeds 20 pts. mass, the intrinsic physical properties of the polyolefin are impaired.

The mixture thus prepared is input to a general extruder, melt and kneaded therein undergoing graft reaction, and thereby a graft modified material is obtained. At this time, as the extruder to be used, both types of a non-vented extruder and a vented extruder may be used, but a vented extruder is desirable in terms of eliminating the unsaturated compounds that are unreacted or monopolymerized and decomposition products of organic peroxides. Furthermore, the kneading temperature is 230 to 300° C. Though, the temperature may vary depending on the kind of a polyolefin and organic peroxide to be used, 230 to 250° C. is desirable. In addition, the residence time of the mixture in the extruder is 60 seconds or longer, and particularly, 90 seconds or longer is preferable. If the kneading temperature is lower than 230° C., the graft reaction is not well performed. On the other hand, if the kneading temperature exceeds 300° C., part of the polyolefin deteriorates. In addition, if the residence time of the mixture in the extruder is less than 60 seconds, satisfactory graft reaction does not occur.

There are commercialized products of the copolymer of an anhydride such as an unsaturated carboxylic acid or an unsaturated dicarboxylic acid and an α-olefin, and such commercialized products may be used.

The second layer 2 of the invention may use the copolymer singularly, or a mixed composition of the copolymer and the polyolefin. In the latter case, a ratio of the melt viscosity of the copolymer and the melt viscosity of the polyolefin η (polyolefin)/η (copolymer) under a constant temperature is preferably 2.0 or higher. In the case of a ratio less than 2.0, the copolymer and the polyolefin tend to be uniformly microdispersed. Thus, a polar group existing on the interface between the polyamide and the second layer 2 is diluted, and thereby sufficient adhesiveness is not exhibited.

The second layer 2 is a layer having the copolymer of the anhydride such as an unsaturated carboxylic acid or an unsaturated dicarboxylic acid and the α-olefin as the main component, the total amount of the second layer 2 may be constituted by the copolymer. On the other hand, other resins can also be included in the second layer 2. In this case, the adhesive intensity is lowered. However, as a result of an experiment conducted by the present applicant, the second layer 2 can be prepared even with a mixture of a 50% copolymer and a 50% polyolefin.

The thickness of the second layer 2 is 2 to 15%, and preferably 2 to 10% of the total thickness. If the thickness is less than 2% thereof, adhesiveness with the polyamide becomes insufficient. If the thickness of the second layer 2 exceeds 15%, it is not preferable in that the physical property of strength as a film is impaired, and the production cost unnecessarily increases.

The sealing layer 3 of the invention refers to the layer adjacent to the second layer 2 having the polyolefin as the main component in the opposite side of the first layer 1, and may be a single layer or multiple layers. As a polyethylene of the sealing layer 3, a low-density polyethylene, a high-density polyethylene, and a linear low-density polyethylene can be exemplified, and may be a single composition or a mixed composition thereof. Particularly, a mixture of 60 to 95 mass % of a linear low-density polyethylene that is excellent in transparency, flexibility, and impact resistance and 5 to 40 mass % of a high-density polyethylene that is excellent in heat resistance is preferable in that the mixture has a property that supplements each other.

The linear low-density polyethylene of the invention refers to a copolymer of ethylene and one or more kinds of an α-olefin selected from α-olefins having 3 to 20 carbon atoms. Among the α-olefins having 3 to 20 carbon atoms, an α-olefins having 3 to 12 carbon atoms is preferable. Specifically, propylene, 1-butene, 1-pentene, 4-methyl-1-pentene, 1-hexene, 1-octene, 1-decene, 1-dodecene, or the like can be exemplified, and, propylene, 1-butene, 1-hexene, or 1-octene are preferable. The content amount of α-olefin contained in the copolymer is generally 1 to 30 mol %, and preferably 3 to 20 mol %. In addition, a linear low-density polyolefin can be preferably used in which the density thereof measured by JIS-K7112-D method is 0.900 to 0.940 g/cm$^3$, and a melt mass-flow rate (MFR) measured under conditions of temperature of 190° C., and load of 21.18N based on JIS-K7210 is a rate of 0.1 to 20 g/10 minutes.

As the high-density polyolefin of the invention, a high-density polyolefin having density of 0.940 to 0.970 g/cm$^3$, and an MFR of 0.1 to 20 g/10 minutes can be preferably used. The measurement conditions of the density and the MFR is the same as those of the linear low-density polyethylene.

In addition, in order to enhance transparency and heat resistance, a crystal nucleating agent may be added to the polyolefin of the sealing layer 3. As an example of a preferable crystal nucleating agent, a mixture of cyclohexane dicarboxylic acid calcium salt and zinc stearate is exemplified. It is effective to blend the nucleating agent with the sealing layer 3 so that the agent accounts for 2.5 mass % or less of the total mass of the sealing layer 3. The lower limit of the amount of the nucleating agent to be added is about 0.5 mass %.

The melting peak temperature of the sealing layer 3 is equal to or lower than the melting peak temperature of the first layer 1, and the difference between the melting peak temperature of the first layer 1 and the melting peak temperature of the sealing layer 3 is 40° C. or larger, preferably 50° C. or larger. If the difference of the temperatures is less than 40° C., it is not preferable in that it is easy for the film to get damaged by heat sealing. Though the upper limit of the difference of the melting peak temperatures is not particularly limited, it is generally around 100° C. If the difference of melting points of the first layer 1 and the sealing layer 3 is too large, the sealing layer 3 is also produced into a film at a high temperature in coextrusion. Accordingly, viscosity of the sealing layer 3 remarkably deteriorates, and therefore, stable film production cannot be attained.

The thickness of the sealing layer 3 is 70 to 96%, preferably 73 to 95%, and more preferably 75 to 90% of the total thickness of the plastic film. If the thickness of the sealing layer 3 is less than 70% thereof, the physical property of strength as a film is impaired. If the thickness exceeds 96% thereof, the thicknesses of the first layer 1 and the second layer 2 are insufficient.

All measured values of the plastic film of the invention for each test stipulated in Plastic Pharmaceutical Container Test Act of General Test Act of the First Part of The Japanese Pharmacopoeia, Fifteenth Edition are within the specifications of a polyethylene or polypropylene aqueous parenteral injection container.

The total thickness of the film of the invention is not particularly limited. However, considering transparency, flexibility, impact resistance, water vapor permeability, and the like, the range of 50 to 1000 µm is preferable. In addition, considering heat resistance in processing and in use thereof, the range of 100 to 350 µm is appropriate, and particularly, the range of 150 to 250 µm is preferable.

Figure 2:
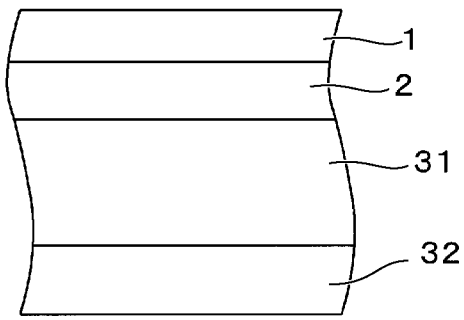
FIG. 2 is a partial cross-sectional view of a modified example of the plastic film according to the invention.

A layer structure of a modified example of the plastic film of the invention is shown in FIG. 2. The film is structured with four layers including, from the top, the first layer 1, the second layer 2, a sealing layer 31 maintaining transparency and flexibility, and a direct-melt sealing layer 32 adjacent to the sealing layer 31.

When the sealing layers are two layers, it is preferable for the sealing layer 31 to be the main layer. More specifically, a thickness ratio of the sealing layer 31 adjacent to the second layer to the direct-melt sealing layer 32 is preferably in the range of 50 to 97:50 to 3, further preferably 70 to 95:30 to 5.

Specifically, the sealing layer 31 adjacent to the second layer is set to be a mixture of 60 to 95 mass % of linear low-density polyolefin and 5 to 40 mass % of high-density polyolefin as a resin of the sealing layer to be used, and the direct-melt sealing layer 32 is set to a layer only including high-density polyolefin. By setting the sealing layers as above, it is possible to reliably prevent blocking occurring when parts of the surfaces of the sealing layers tightly stick to each other after steam autoclaving.

Figure 3:
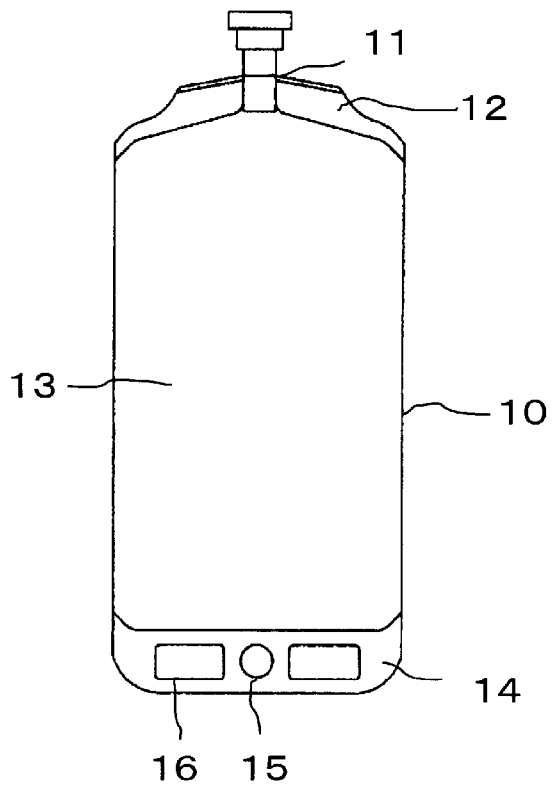
FIG. 3 is a plan view of an example of an infusion bag made of the plastic film according to the invention.

FIG. 3 shows an example of an infusion bag of the invention manufactured using the plastic film of the invention.

The infusion bag is a bag in which a pouring opening 11 is provided at a first edge of the main body of the infusion bag that is made of a tube-like plastic film 10 and processed with heat sealing, an infusion is filled in an infusion containing part 13 with having a first edge heat sealed part 12 as the bottom, and then a second edge is processed with heat sealing. In the center of a second edge heat sealed part 14, a hanging hole 15 is formed by punching, and rectangular non-sealed parts 16 are provided in both sides thereof. At the tip of the pouring opening 11, a rubber plug into which an injection needle is inserted is provided. Furthermore, the pouring opening may also be a tube.

The plastic film of the invention is made into a film with multi layers of at least three layers or more in one process by a co-extrusion method. The co-extrusion is possible both in making a roll-shaped film by a multi-layered T die and in making a tubular film by multi-layered inflation. However, when a medical container is made, it is preferable to be made in a tubular shape in which the inner surface of the film for containing a medicinal solution is rarely exposed to the outside. Furthermore, in order to exhibit high transparency, water-cooling co-extrusion inflation, in which rapid cooling and solidifying from a melt state is performed, is appropriate.

Example 1

The invention will be described in further detail with examples.

A plastic film layer was formed by using different resins in the first layer, the second layer, and the sealing layer in Examples 1 to 5 and Comparative Examples 1 and 2. The heat sealing property, the elution test of Pharmacopoeia, the haze, the appearance, and the blocking property of the obtained plastic were evaluated.

Resins Used in Each Layer:

The resins used in the first layer, the second layer, and the sealing layer in Examples 1 to 5 and Comparative Examples 1 and 2 are as follows:

PA12: Nylon 12, made by Arkema, RILSAN "AESN 0 TL", density=1.01 g/cm$^3$, melting peak temperature=176° C.;

PA11: Nylon 11, made by Arkema, RILSAN "BESV 0 A FDA", density=1.02 g/cm$^3$, melting peak temperature=184° C.;

PA6: Nylon 6, made by Ube Industries, UBE Nylon "1024B", density=1.14 g/cm$^3$, melting peak temperature=223° C.;

AD: Maleic anhydride-grafted polypropylene, ZELAS "MC721AP" made by Mitsubishii Chemical Corporation, density=0.89 g/cm$^3$, MFR=3.5 g/10 minutes, melting peak temperature=155° C.;

LLD: Linear low-density polyethylene, made by Prime Polymer, Evolue "SP0511", density=0.903 g/cm$^3$, MFR=1.2 g/10 minutes, melting peak temperature=110.1° C.; and HD: High-density Polyethylene, made by Japan Polyethylene Corporation, Novatec, density=0.955 g/cm$^3$, MFR=3.5 g/10 minutes, melting peak temperature=132.4° C.

Table 2 shows resins of each layer used in each of the Examples and Comparative Examples.

The mixture of 80 mass % of LLD and 20 mass % of HD was used for the sealing layers of Examples 1 to 3 and Comparative Examples 1 and 2, and for the first layer of Comparative Example 1. The melting peak temperature of the mixture was 125° C.

The sealing layer of Example 5 was made up of two layers including 120 µm layer adjacent to the second layer constituted by LLD (80%) and HD (20%) and 10 µm direct-melt sealing layer that is adjacent to the layer adjacent to the second layer and constituted by 100% of HD.

Film-Forming Method of Plastic Film Layer:

The formation of a plastic film was performed with a three-kind-three-layer or four-kind-four-layer type water cooling inflation film-forming machine under the following conditions.

First layer: with a screw extruder having an outer diameter of 40 mm and a compression ratio of 2.7 (the extruding temperature of 200° C., but 250° C. only in Comparative Example 2)

Second layer: with a screw extruder having an outer diameter of 65 mm and a compression ratio of 1.4 (the extruding temperature of 210° C.)

Sealing layer: with a screw extruder having an outer diameter of 40 mm and a compression ratio of 2.7 (the extruding temperature of 190° C.)

Die: an outer diameter of 200 mm, a lip clearance of 3 mm, and the temperature of 210° C. (250° C. only in Comparative Example 2)

Blow rate: 0.6

Film-formation rate: 13 m/minute

Water cooling: a lip outer diameter of 120 mm, and the water temperature of 11.5° C.

The evaluation of each property was performed as follows.

Heat Sealing Property:

Heat sealing was performed at different temperatures in order to examine the influence that the temperature of heat sealing brings about. In other words, sealing layers of two sample films are laminated, and heat sealing was performed by using upper and lower heat sealing plates having temperatures increasing four different points (180° C., 200° C., 220° C., and 240° C.) under the pressure of 0.2 MPa. In addition, heat sealing was performed for different durations in order to examine the influence that a heat sealing duration brings about. Examined heat sealing durations are 0.1, 0.3, 0.5, 1.0, 2.0, and 3.0 seconds.

A heat sealing duration was selected while watching a result of the heat sealing property of each film at the above-described different temperatures under the pressure of 0.2 MPa.

The samples that have undergone heat sealing with the above-described method were cut into strips having a width of 15 mm, peeling was performed at a tensile speed of 300 mm/minute using a tensile tester based on JIS-K6854-3, and the heat sealing property was evaluated using the grades of A to D-- defined below.

A: No damage is found on the outer surface of the film, and the peeling strength is also high. The peeling strength is 50N/15 mm or more.

B+: No damage is found on the outer surface, but the peeling strength is slightly low. The peeling strength is 30 to 50N/15 mm.

B−: A slight reduction in the thickness caused by damage on the outer surface is found, but the peeling strength is high. The peeling strength is 50N/15 mm or more.

C+: No damage is found on the outer surface, but the peeling strength is low. The peeling strength is less than 30 N/15 mm.

C−: A reduction in the thickness caused by damage on the outer surface is found, but the peeling strength is high. The peeling strength is 50N/15 mm or more.

D+: No damage is found on the outer surface, but sealing is not attained.

D−: A reduction in the thickness of the outer surface is noticeable, but the peeling strength is high. The peeling strength is 50N/15 mm or more.

D--: A reduction in the thickness of the outer surface is noticeable, melt films partially stick to perforations and the sealing plates, and the peeling strength is high. The peeling strength is 50N/15 mm or more.

Elution test prescribed by Pharmacopoeia: An elution test stipulated in the Fifteenth Amendment of General Test Act and Plastic Pharmaceutical Container Test Act of General Test Act of the First Part of the Japanese Pharmacopoeia, Fifteenth Edition was performed for the sample films of each Example and Comparative Example obtained as described above. It has been determined whether or not measure values of the elution test are within the specifications of a polyethylene or polypropylene aqueous parenteral injection container in the below table.

TABLE 1

| Test Items | Specifications |
|---|---|
| Heavy metal | 20 μg/g or less |
| Lead | 10 μg/g or less |
| Cadmium | 1.0 μg/g or less |
| Ignition residue | 0.1% or less |
| Effervescence | Almost disappears within 3 minutes |
| pH | The difference is 1.5 or less. |
| Potassium permanganate reducing agent | The difference is 1.0 ml or less. |
| Ultraviolet absorption spectrum (a wavelength of 220 nm or higher and less than 241 nm) | 0.08 or less |
| Ultraviolet absorption spectrum (a wavelength of 241 nm or higher and 350 nm and lower) | 0.05 or less |
| Evaporation Residue | 1.0 mg or less |

Evaluation on the haze: Two sample films cut into 10×10 cm were laminated so that the sealing layers comes into contact with each other, and a three-edge sealed bag was prepared by heat sealing. The bag was filled with 50 ml of distilled water, and remaining one part was sealed by heat sealing. Next, under the conditions of temperature of 121° C. for 30 minutes, steam autoclaving was performed so that parts of the inner surfaces of the bag tightly contact each other. After that, the bag was swiftly opened and the distilled water was discharged, and normal state adjustment was performed for 24 hours for the sample films of each Example and Comparative Example under the environment of temperature of 23° C. and humidity of 50% RH. The hazes of the sample films were measured through an operation based on JIS-K6714.

Appearance of the Films (Presence of Crinkles):

The presence of crinkles on the outer surface of the bag that has undergone steam autoclaving at 121° C. for 30 minutes used in the evaluation of the haze was visually assessed.

Blocking:

Steam autoclaving at 121° C. for 30 minutes was performed while making parts of the inner surfaces of the bag tightly contact each other. When the bag was opened after steam autoclaving, the inner surfaces of the bag can be completely separated from each other. However, when at least some parts were found to tightly contact each other, it was determined as "blocking found", and when no parts were found to tightly contact each other, it was determined as "blocking not found".

The obtained results are shown in Table 2.

TABLE 2

| Examples | First Layer (10 μm) | Second Layer (10 μm) | Sealing Layer (130 μm) | Heat Sealing Temperature (° C.) | Heat Sealing Duration (sec.) | Elusion Test of Pharmacopoeia | Haze (after autoclaving at 121° C.) | Presence of Crinkles | Blocking |
|---|---|---|---|---|---|---|---|---|---|
| Example 1 | PA12 | AD | LLD (80%) + HD (20%) | 180 | 0.5: C+ 1.0: A | All test items are appropriate | 9.3 | None | Found |
|  |  |  |  | 200 | 0.5: A 1.0: A |  |  |  |  |
|  |  |  |  | 220 | 0.3: A 0.5: A |  |  |  |  |
|  |  |  |  | 240 | 0.1: C− 0.3: D− |  |  |  |  |

TABLE 2-continued

| Examples | First Layer (10 μm) | Second Layer (10 μm) | Sealing Layer (130 μm) | Heat Sealing Temperature (° C.) | Heat Sealing Duration (sec.) | Elusion Test of Pharmacopoeia | Haze (after autoclaving at 121° C.) | Presence of Crinkles | Blocking |
|---|---|---|---|---|---|---|---|---|---|
| Example 2 | PA11 | AD | LLD (80%) + HD (20%) | 180 | 0.5: D+ 1.0: B+ | All test items are appropriate | 10.1 | None | Found |
| | | | | 200 | 0.5: A 1.0: A | | | | |
| | | | | 220 | 0.3: A 0.5: A | | | | |
| | | | | 240 | 0.1: A 0.3: A | | | | |
| Example 3 | PA12 (50%) + PA11 (50%) | AD | LLD (80%) + HD (20%) | 180 | 0.5: C+ 1.0: A | All test items are appropriate | 9.8 | None | Found |
| | | | | 200 | 0.5: A 1.0: A | | | | |
| | | | | 220 | 0.3: A 0.5: A | | | | |
| | | | | 240 | 0.1: B− 0.3: C− | | | | |
| Example 4 | PA11 | AD | LLD (100%) | 180 | 0.5: B+ 1.0: A | All test items are appropriate | 14.2 | Present | Found |
| | | | | 200 | 0.5: A 1.0: A | | | | |
| | | | | 220 | 0.3: A 0.5: A | | | | |
| | | | | 240 | 0.1: A 0.3: A | | | | |
| Example 5 | PA11 | AD | LLD (80%) + HD (20%) | 180 | 0.5: D+ 1.0: D+ | All test items are appropriate | 11.3 | None | Not Found |
| | | | | 200 | 0.5: B+ 1.0: A | | | | |
| | | | | 220 | 0.3: A 0.5: A | | | | |
| | | | HD (100%) | 240 | 0.1: A 0.3: A | | | | |
| Comparative Example 1 | LLD (80%) + HD (20%) | AD | LLD (80%) + HD (20%) | 180 | 0.5: D+ 1.0: D+ | All test items are appropriate | 17.2 | None | Found |
| | | | | 200 | 2.0: B+ 3.0: A | | | | |
| | | | | 220 | 1.0: D+ 2.0: A | | | | |
| | | | | 240 | 0.5: D+ 1.0: C− 2.0: D− 0.3: D+ 0.5: C− 1.0: D− | | | | |
| Comparative Example 2 | PA6 | AD | LLD (80%) + HD (20%) | 180 | 0.5: D+ 1.0: B+ | The ultraviolet adsorption spectrum (a wavelength of 220 to 241 nm) was 0.52 which is inappropriate (based on the specification value of 0.08), and (a wavelength of 241 to 350 nm) was 0.31 which is inappropriate (based on the specification value of 0.05) | 8.5 | None | Found |
| | | | | 200 | 0.5: A 1.0: A | | | | |
| | | | | 220 | 0.3: A 0.5: A | | | | |
| | | | | 240 | 0.1: A 0.3: A | | | | |

With regard to the result of blocking, at least some parts were tightly contacted each other when the bag was opened after steam autoclaving, except in Example 5 in which the sealing layer has a two-layer structure. In addition, in Example 5, the heat sealing temperature needs to be a high temperature, but the heat sealing duration could be a short time period. Therefore, from the result of Example 5, it was ascertained that the sealing layer does not show blocking by including the direct-melt sealing layer only constituted by high-density polyethylene. However, it was found from Example 4 that, if the sealing layer is constituted only by linear low-density polyethylene, crinkles occur, and the haze deteriorates further than that in other examples.

If Example 1 that includes the first layer constituted by PA12 is compared to Example 2 that includes the first layer constituted by PA11, the optimum temperature of heat sealing in Example 2 was higher than that in Example 1, and the haze therein further deteriorated than that in Example 1. Example 3 used a mixture layer including each 50% of PA11 and PA12 as the first layer, but the optimum temperature of heat sealing and the haze in Example 3 showed the intermediate values between those of Example 1 and Example 2.

Comparative Example 1 used a film using the same resin in the first layer as that of the sealing layer. The results of blocking, crinkles, and elution test were the same as those of Examples, but the haze and the heat sealing property noticeably deteriorated.

Comparative Example 2 is a film using PA6 in the first layer. With respect to the film, the most favorable results of the haze and the heat sealing property were obtained therein among Examples and Comparative Examples. However, it was not possible to meet the specifications of the elution test prescribed by Pharmacopoeia.

When attention is paid to the difference between the melting peak temperature of the first layer and the melting peak temperature of the sealing layer, the difference is the first layer (184° C.: PA11)–the sealing layer (125° C.: 80% of LLD and 20% of HD), which is 59° C., for example, in Example 2. However, since the same resin as that of the sealing layer was used for the first layer in Comparative Example 1, the difference of the melting peak temperatures is 0° C. In Comparative Example 2, since the melting peak temperature of PA6 is 223° C., the difference of the melting peak temperatures is 98° C.

From the above results, it was found that the film of Example 5, which includes nylon 11 having 11 or more carbon atoms and further includes a direct-melt sealing layer constituted only by high-density polyethylene as the sealing layer, is satisfactory in that blocking of the sealing layer does not occur while the haze deteriorates a little.

INDUSTRIAL APPLICABILITY

The plastic film of the invention can be widely used in bags for infusions and medical solutions, and the like since the film can be swiftly made into bags without giving damage on the film surface, and is excellent in hygienic safety.

REFERENCE SIGNS LIST

1 . . . first layer
2 . . . second layer
3 . . . sealing layer
10 . . . plastic film
11 . . . pouring opening
12 . . . front edge heat sealed part
13 . . . infusion containing part
14 . . . rear edge heat sealed part
15 . . . hanging hole
16 . . . non-sealed part
31 . . . sealing layer for maintaining transparency and flexibility
32 . . . direct-melt sealing layer

The invention claimed is:

1. A plastic film formed in a co-extrusion method including at least three layers, comprising:
   a first layer that contains a polyamide which is a nylon 11;
   a second layer that contains as the main component a copolymer of an α-olefin and an anhydride monomer of an unsaturated carboxylic acid or an unsaturated dicarboxylic acid; and
   a sealing layer that contains a polyethylene as the main component,
   wherein the sealing layer includes two layers which are a layer adjacent to the second layer constituted by a mixture of 60 to 95 mass % of a linear low-density polyethylene and 5 to 40 mass % of high-density polyethylene, and a layer which is adjacent to the layer adjacent to the second layer and constituted by a high-density polyethylene.

2. The plastic film according to claim 1, wherein the melting peak temperature of the first layer is 175° C. or higher, and the difference between the melting peak temperature of the first layer and the melting peak temperature of the sealing layer is 40° C. or larger.

3. The plastic film according to claim 1, which is formed by a co-extruder using a water cooling inflation method.

4. The plastic film according to claim 2, which is formed by a co-extruder using a water cooling inflation method.

5. An infusion bag in which a pouring opening is provided on the main body of the infusion bag formed of the plastic film according to claim 1.

* * * * *